(12) United States Patent
Steimer

(10) Patent No.: US 12,341,417 B2
(45) Date of Patent: Jun. 24, 2025

(54) ARC FURNACE POWER SUPPLY WITH CONVERTER CIRCUIT

(71) Applicant: ABB Schweiz AG, Baden (CH)

(72) Inventor: Peter Karl Steimer, Ehrendingen (CH)

(73) Assignee: ABB Schweiz AG, Baden (CH)

( * ) Notice: Subject to any disclaimer, the term of this patent is extended or adjusted under 35 U.S.C. 154(b) by 761 days.

(21) Appl. No.: 17/623,125

(22) PCT Filed: Apr. 30, 2020

(86) PCT No.: PCT/EP2020/062153
§ 371 (c)(1),
(2) Date: Dec. 27, 2021

(87) PCT Pub. No.: WO2020/259900
PCT Pub. Date: Dec. 30, 2020

(65) Prior Publication Data
US 2022/0271681 A1    Aug. 25, 2022

(30) Foreign Application Priority Data

Jun. 27, 2019 (EP) .................................... 19182897

(51) Int. Cl.
*H05B 1/02*    (2006.01)
*H02M 1/12*    (2006.01)
(Continued)

(52) U.S. Cl.
CPC ............. *H02M 1/12* (2013.01); *H02M 1/126* (2013.01); *H02M 1/36* (2013.01); *H02M 5/12* (2013.01); *H02M 7/4835* (2021.05)

(58) Field of Classification Search
CPC .......... A23C 9/005; A23C 9/156; H02M 1/12; H02M 1/126; H02M 1/32; H02M 1/36;
(Continued)

(56) References Cited

U.S. PATENT DOCUMENTS 5,239,554 A    8/1993    Gensini et al.
5,655,380 A    8/1997    Carlton
(Continued)

FOREIGN PATENT DOCUMENTS

CN    102195289 A    9/2011
CN    102388518 A    3/2012
(Continued)

OTHER PUBLICATIONS

Office Action issued in Chinese Patent Application No. 202080046523.3, dated Mar. 16, 2023, 8 pages.
(Continued)

*Primary Examiner* — Quang T Van
(74) *Attorney, Agent, or Firm* — McCarter & English, LLP

(57) ABSTRACT

A power supply system for an electric arc furnace includes an AC input connectable to an electrical grid and an AC output for supplying at least one power electrode of the arc furnace. The power supply system further includes a converter circuit interconnected between the AC input and the AC output. The converter circuit includes at least one converter cell with a capacitor and semiconductor switches for series connecting the capacitor between a circuit input and a circuit output of the converter circuit.

16 Claims, 5 Drawing Sheets

(51) Int. Cl.
  *H02M 1/36* (2007.01)
  *H02M 5/12* (2006.01)
  *H02M 7/483* (2007.01)
  *H05B 7/14* (2006.01)
(58) Field of Classification Search
  CPC ........ H02M 5/12; H02M 5/257; H02M 5/293; H02M 7/4835; H05B 7/144; Y02P 10/25
  USPC ........ 373/104, 102, 103, 105, 106, 107, 108
  See application file for complete search history.

(56) References Cited

U.S. PATENT DOCUMENTS

| | | | |
|---|---|---|---|
| 6,274,851 | B1 | 8/2001 | Mulcahy |
| 6,573,691 | B2 | 6/2003 | Ma et al. |
| 6,603,795 | B2 | 8/2003 | Ma et al. |
| 8,933,378 | B2 | 1/2015 | Horger |
| 9,438,136 | B2 | 9/2016 | Kim |
| 2003/0048006 | A1 | 3/2003 | Shelter et al. |
| 2008/0063024 | A1 | 3/2008 | Pasch et al. |
| 2008/0123714 | A1 | 5/2008 | Konig |
| 2011/0176575 | A1 | 7/2011 | Horger et al. |
| 2015/0333660 | A1 | 11/2015 | Kim et al. |
| 2017/0208654 | A1* | 7/2017 | Doebbeler ............. H05B 7/144 |
| 2018/0242411 | A1 | 8/2018 | Shen et al. |
| 2019/0131791 | A1 | 5/2019 | Campbell et al. |

FOREIGN PATENT DOCUMENTS

| | | | |
|---|---|---|---|
| CN | 207218264 | U * | 4/2018 |
| EP | 0589544 | B1 | 1/2002 |
| EP | 2947766 | A1 | 11/2015 |
| JP | 2006-019259 | A | 1/2006 |
| RU | 2477588 | C2 | 3/2013 |
| SU | 1742968 | A1 | 6/1992 |
| WO | 9614686 | A1 | 5/1996 |
| WO | 2017085330 | A1 | 5/2017 |

OTHER PUBLICATIONS

PCT International Search Report, Application No. PCT/EP2020/062153, dated Jul. 16, 2020, 4 pages.
PCT Written Opinion, Application No. PCT/EP2020/062153, dated Jul. 16, 2020, 9 pages.
PCT International Preliminary Report on Patentability, Application No. PCT/EP2020/062153, dated Feb. 16, 2021, 13 pages.
European Extended Search Report, Application No. 19182897.9, dated Jan. 2, 2020, 8 pps.
English Translation of Decision to Grant a Patent for Invention and Search Report issued in Russian Patnet Application No. 2022101684/07(003482), issued Jun. 1, 2023, 9 pages.

* cited by examiner

ARC FURNACE POWER SUPPLY WITH CONVERTER CIRCUIT

CROSS REFERENCE TO RELATED APPLICATIONS

This patent application is a National Stage Entry of PCT/EP2020/062153 filed on Apr. 30, 2020, which claims the benefit and priority of European Patent Application No. 19182897.9 filed on Jun. 27, 2019, the disclosures of which are incorporated by reference herein in their entirety as part of the present application.

BACKGROUND

The disclosure relates to the field of arc furnaces. In particular, the disclosure relates to a power supply system for an electric arc furnace, a method for controlling the power supply system as well as to an arc furnace with such a power supply system.

Electric arc furnaces are often directly connected to an AC grid via a transformer. It then may be difficult to limit the electrode current during operation, which may limit the electrode usage and the productivity. Additionally, the transformer may need then a costly on-load tap changer system, which is often used and the arc furnace may generate flicker in the AC grid. Therefore, an additional static var compensator may be necessary to mitigate the flicker issues.

In EP0589544B1 and U.S. Pat. No. 6,603,795B2, an arc furnace power supply is shown, which is adapted for clipping the electrode current with series-connected antiparallel thyristors with or without a parallel inductor. In such a way, the productivity of the arc furnace may be improved. However, by clipping the current, an internal resistance of the arc furnace may be increased more than necessary, which may reduce the efficiency of the arc furnace.

US2011/176575A1 relates to a power supply system for a three-phase arc furnace with an AC-to-AC converter composed of a rectifier and an inverter. The rectifier and the inverter include series-connected converter cells with cell capacitors.

EP2947766A1 also relates to a power supply for an arc furnace. The power supply includes a converter system with converter units, each of which includes main modules that are composed of series-connected converter cells.

BRIEF DESCRIPTION

Embodiments of the present disclosure provide an arc furnace power supply, with controllable electrode current and high efficiency.

It is achieved by the subject-matter of the independent claims. Further exemplary embodiments are evident from the dependent claims and the following description.

A first aspect of the present disclosure relates to a power supply system for an electric arc furnace. An electric arc furnace may be a device, which is adapted for melting or smelting metal materials with the aid of an arc that is produced by an electric current. The electric current is produced by the power supply system, which may be connected between a medium AC electrical grid and electrodes of the arc furnace. The power supply system also may include a transformer, which transforms a medium AC input voltage into a low AC output voltage, which is supplied to the electrodes.

A medium voltage may be a voltage between 1 kV and 20 kV. A low voltage may be a voltage below 1 kV. It has to be noted that the current through the electrodes may be higher than 1000 A.

The power supply system may be a multi-phase system having several, such as three, phases. The input voltage may be a three-phase voltage, with, for example, 50 or 60 Hz.

According to an embodiment of the present disclosure, the power supply system includes an AC input, which may include one or more phases, connectable to an electrical grid and an AC output, which may include one or more phases, for supplying at least one power electrode of the arc furnace. The AC input may include three phases. Also, the AC output may include three phases. The AC input has at least two phases, such as three phases, and/or the AC output has at least two phases, such as three phases.

According to an embodiment of the present disclosure, the power supply system includes converter circuits interconnecting the AC input and the AC output. The converter circuit may be or may include a voltage source inverter, i.e. a converter with a capacitor as energy storage. A converter circuit as described in the above and in the following is interconnected in each phase of the AC input or the AC output. In the case of a multi-phase system, every phase of the side of the power supply before or after a transformer may be provided with a converter circuit.

Each converter circuit may include at least one converter cell with a capacitor and semiconductor switches for series connecting the capacitor between a circuit input and a circuit output of the converter circuit. The converter cell may be a floating converter cell interconnected into a phase of the power supply system.

Each converter circuit and/or the converter cell may be a voltage source inverter, which may be adapted to process about 10% to 15% of a main power of the power supply system.

With the converter circuits and/or the converter cell a power flow through the power supply system may be controlled and a short-circuit current may be limited. In particular, the current through the power supply device may be controlled and/or adjusted to a specific defined current, which may be lower and/or higher than a maximal current that may be generated by the power supply system. A higher current may be generated with current boosting.

According to an embodiment of the present disclosure, the semiconductor switches of the converter cell form two parallel connected half-bridges, which midpoints are connected between the circuit input and the circuit output. A half-bridge may include two series-connected semiconductor switches providing the midpoint between them. The two paralleled half-bridges may be seen as a full-bride. The semiconductor switches may be IGCTs and/or IGBTs.

According to an embodiment of the present disclosure, the capacitor is connected in parallel to the half-bridges. In such a way, the capacitor may be disconnected from a current path between the circuit input and the circuit output and/or may be connected to the current path. Furthermore, the capacitor may be connected in reverse directions to the current path.

According to an embodiment of the present disclosure, each converter circuit includes a plurality of converter cells connected in series between the circuit input and the circuit output. Each of these converter cells may be designed as described above and below. In such a way, the voltage rating of the converter circuit may be improved.

According to an embodiment of the present disclosure, each converter circuit includes a controllable bypass switch, which is connected in parallel with the at least one converter cell and which is adapted for connecting and disconnecting the circuit input and the circuit output. When the bypass switch is open, a current through the converter circuit solely may flow through the at least one converter cell from the circuit input to the circuit output and vice versa. In the case, the bypass switch is closed, the current also may flow from the circuit input through the bypass switch to the circuit output and vice versa. With the bypass switch, the converter cell may be bypassed and/or protected from overcurrent and/or overvoltage.

According to an embodiment of the present disclosure, the bypass switch is composed of semiconductor switches. For example, the bypass switch may include one or more transistors or thyristors, such as IGBTs, IGCTs, etc. The bypass functionality may be realized by semiconductor switches (such as IGCTs) of the converter cells, so that no separate bypass may be needed.

According to an embodiment of the present disclosure, the bypass switch is a bidirectional switch. This may be achieved by connecting two unidirectional semiconductor switches anti-parallel to each other.

According to an embodiment of the present disclosure, the bypass switch includes two anti-parallel semiconductor switches, such as two anti-parallel thyristors. Thyristors are adapted for switching high currents as usually are present in the power supply of an arc furnace.

According to an embodiment of the present disclosure, the bypass switch is a mechanical switch. A mechanical switch may include mechanical components that are actuated by a drive for disconnecting a connecting its inputs.

According to an embodiment of the present disclosure, an inductor may be connected in series with the at least one converter cell. In general, it may be that one or more passive reactances (such as capacitors, inductors, and/or reactors) are connected in series with the converter cell and/or in parallel with the bypass switch.

According to an embodiment of the present disclosure, a further inductor may be connected in series with the bypass switch between the circuit input and the circuit output. The further inductor may be decoupled from the current through the converter circuit, when the bypass switch is open.

According to an embodiment of the present disclosure, the further inductor is connected in parallel with the at least one converter cell and/or a passive reactance, such as an inductor, capacitor, etc. connected in series with the at least one converter cell. When the bypass switch is closed, a current through the bypass switch also may flow through the further inductor.

According to an embodiment of the present disclosure, an inductor, which is connected in series with the at least one converter cell, has a higher inductance as the further inductor. For example, the inductor may have an inductance at least 10 times higher as the further inductor.

According to an embodiment of the present disclosure, the power supply system further includes a transformer, which is interconnected between the AC input and the AC output of the power supply system. As already described, the transformer, which may be a multi-phase transformer, may transform a higher AC input voltage into a lower AC output voltage.

According to an embodiment of the present disclosure, the transformer may be interconnected between the AC input and the converter circuit. In other words, the converter circuit may be provided on the side of the power supply system with the higher voltage and/or a primary side of the transformer.

According to an embodiment of the present disclosure, the transformer may be interconnected between the converter circuit and the AC output. In other words, the converter circuit may be provided on the side of the power supply system with the lower voltage and/or a secondary side of the transformer.

According to an embodiment of the present disclosure, the transformer has windings connected to a star-point at a primary side and/or a secondary side, wherein the converter circuit is connected into the star-point. The converter circuit may include three phase parts, which are star-connected at one end and are connected to the windings on another end. Each of these phase parts may be designed like a one phase converter circuit as described in the above and the below.

In summary, the converter circuit may be connected to the primary side, to the secondary side, in the primary side and/or in the secondary side of the transformer.

According to an embodiment of the present disclosure, the power supply system further includes a harmonic filter interconnected in the AC input. With the harmonic filter, higher order harmonics in the AC input voltage, which may be generated by components of the arc furnace, may be filtered out. The harmonic filter may include at least two filter components, each of which includes a filter capacitor and a filter inductor and each of which is adapted to another higher order harmonic of a supply voltage, i.e. the AC input voltage.

The harmonic filter may be a capacitive and/or inductive filter connected in parallel with the AC input. In the case of a multi-phase system, the harmonic filter components may star-connect the phases of the AC input. It has to be noted that also a series-connected filter may be interconnected into the AC input.

According to an embodiment of the present disclosure, the power supply system further includes an active inductive reactor interconnected into the AC input, wherein the active inductive reactor includes a bypass switch and an inductor connected to the AC input. The bypass switch of the active inductive reactor may be designed as the bypass switch of the converter circuit, for example with two anti-parallel thyristors. In the case of a multi-phase system, the active inductive reactor may have reactor branches, which star-connect the phases of the AC input.

According to an embodiment of the present disclosure, the power supply system further includes a compensating converter interconnected into the AC input. The compensating converter may be voltage-source based STATCOM. In the case of a multi-phase system, the compensating converter may have converter branches, which star-connect the phases of the AC input.

The active inductive reactor and/or the compensating converter may be controlled by a controller of the power supply system and/or may be used for compensating variations of the power flow through the power supply system and/or for compensating voltage variations in the AC input.

According to an embodiment of the present disclosure, the active inductive reactor and/or the compensating converter are controlled to minimize a flicker in the AC input. Flicker may be minimized at the point-of-common connection of the arc furnace to the electrical grid. The flicker reduction may be a second control objective in addition to a control of the power flow to the arc furnace. However, additionally and/or alternatively, flicker also may be controlled with the at least one converter cell of the converter circuit.

Flicker in the electrical grid may be fluctuations in the voltage of the grid and may be determined based on voltage measurements in the AC input. The standard IEC 61000-4-15 provides methods and/or formulas for estimating flicker.

Further aspects of the present disclosure relate to a method and a controller for controlling the power supply system as described in the above and in the following. It has to be understood that features of the method as described in the above and in the following may be features of the controller and/or the power supply system as described in the above and in the following. The controller may be adapted for automatically performing the method.

According to an embodiment of the present disclosure, the method includes determining an electrode current supplied to the at least one electrode, and controlling the at least one converter cell, such that the electrode current is adjusted to a defined current, such as a nominal current. A current through the power supply system may be measured by the controller at the input side and/or at the output side. Therefrom, the electrode current may be determined. Depending on the needed power to be supplied to the electrodes, which for example may depend on the phase of the melting process and/or the amount of melted material, a defined current may be provided and the controller may adjust the electrode current to this current. The defined current may be provided by the controller, for example based on measurements in the power supply system. The method allows current control, current limiting and/or current boosting. The defined current may be determined, such that current control, current limiting and/or current boosting is realized.

The power flow through the power supply system may be controlled by controlling and/or influencing a phase shift between the AC input voltage (i.e. the voltage at the AC input) and an AC output voltage (i.e. the voltage at the AC output applied to the at least one electrode). This phase shift may be adjusted by controlling the at least one converter cell.

According to an embodiment of the present disclosure, the method further includes determining a flicker in the AC input of power supply system, and controlling the converter cell, such that the flicker is reduced. Flicker may be actively controlled with the converter circuit. Therefore a compensating converter (such as described above and below may be omitted or at least may be downsized).

According to an embodiment of the present disclosure, the method further includes during a start-up of the power supply system, bypassing the converter cell by closing a bypass switch, and after energization of a transformer connected between the AC input and the AC output, controlling the converter cell for adjusting the electrode current and opening the bypass switch. In such a way, surge currents generated by the transformer, when connecting the power supply system to an electrical grid may be bypassed and the converter cell may be protected during start-up.

According to an embodiment of the present disclosure, the method further includes detecting an overvoltage and/or a surge current in the converter circuit, and protecting the converter circuit, when an overvoltage and/or a surge current is detected, by switching the converter circuit in a bypass state. A bypass state may be a state, in which the converter cell or at least components of the converter cell, such as a cell capacitor, are bypassed.

According to an embodiment of the present disclosure, the converter circuit is switched into a bypass state by switching the converter cell into a bypass state. In the bypass state, a cell capacitor may be disconnected from inputs of the converter cell.

According to an embodiment of the present disclosure, the converter circuit is switched into a bypass state by closing and/or opening a bypass switch. The bypass switch may be used to protect the converter circuit against overvoltage and/or surge currents, for example during start-up and/or transient operation. The voltage and/or the current in the converter circuit may be measured by the controller, which also may compare these values with thresholds, which indicate an overvoltage and/or a surge current. When the corresponding values exceed the threshold, the protection function may be activated. For example, the bypass switch may be closed to reduce the voltage across the converter cell and series connected reactors and/or to reduce a current through these components. When the fault situation is over, the bypass switch can be returned to its initial state.

A further aspect of the present disclosure relates to an electric arc furnace, which includes a power supply system as described in the above and the following.

According to an embodiment of the present disclosure, the electric arc furnace furthermore includes a vessel for receiving metal material and/or power electrodes for melting the metal material, when supplied with current from the power supply system. The power electrodes also may have a mechanical mechanism, which is adapted for adjusting a distance of the electrodes to the metal material.

The electric arc furnace also may include a controller for the power supply system adapted for performing the method as described in the above and in the below. The controller of the power supply system also may control the mechanical mechanism for moving the electrodes for adjusting the impedance of the system including the electrodes and the metal material. Less use of a tap changer and/or less electrode movements are expected. Tap changers may even be eliminated.

These and other aspects of the present disclosure will be apparent from and elucidated with reference to the embodiments described hereinafter.

BRIEF DESCRIPTION OF THE DRAWINGS

The subject-matter of the present disclosure will be explained in more detail in the following text with reference to exemplary embodiments which are illustrated in the attached drawings.

In the drawings, identical parts are provided with the same reference symbols in the figures.

DETAILED DESCRIPTION

Figure 1:
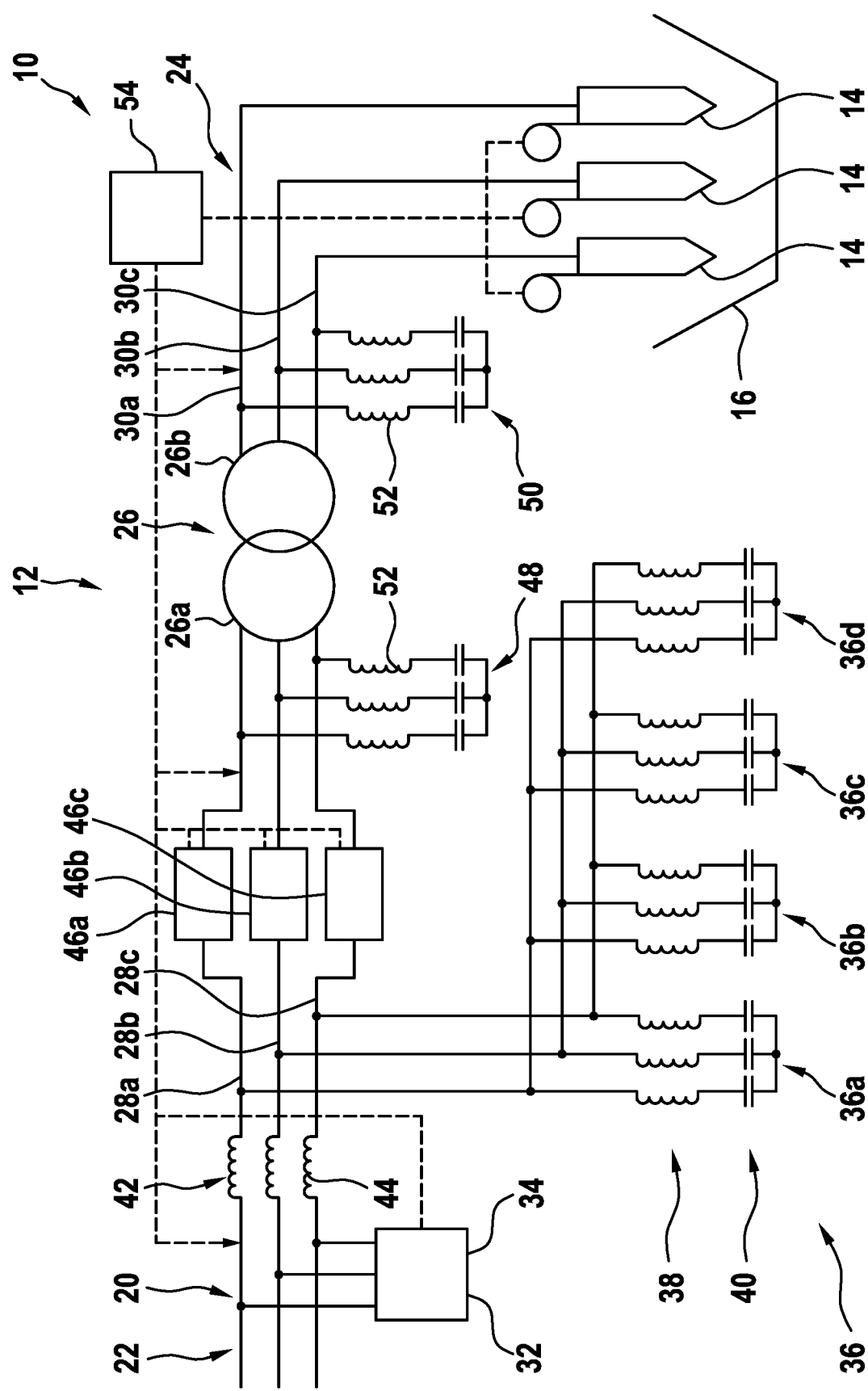
FIG. 1 is a schematic circuit diagram of an arc furnace according to an embodiment of the present disclosure.
Figure 2:
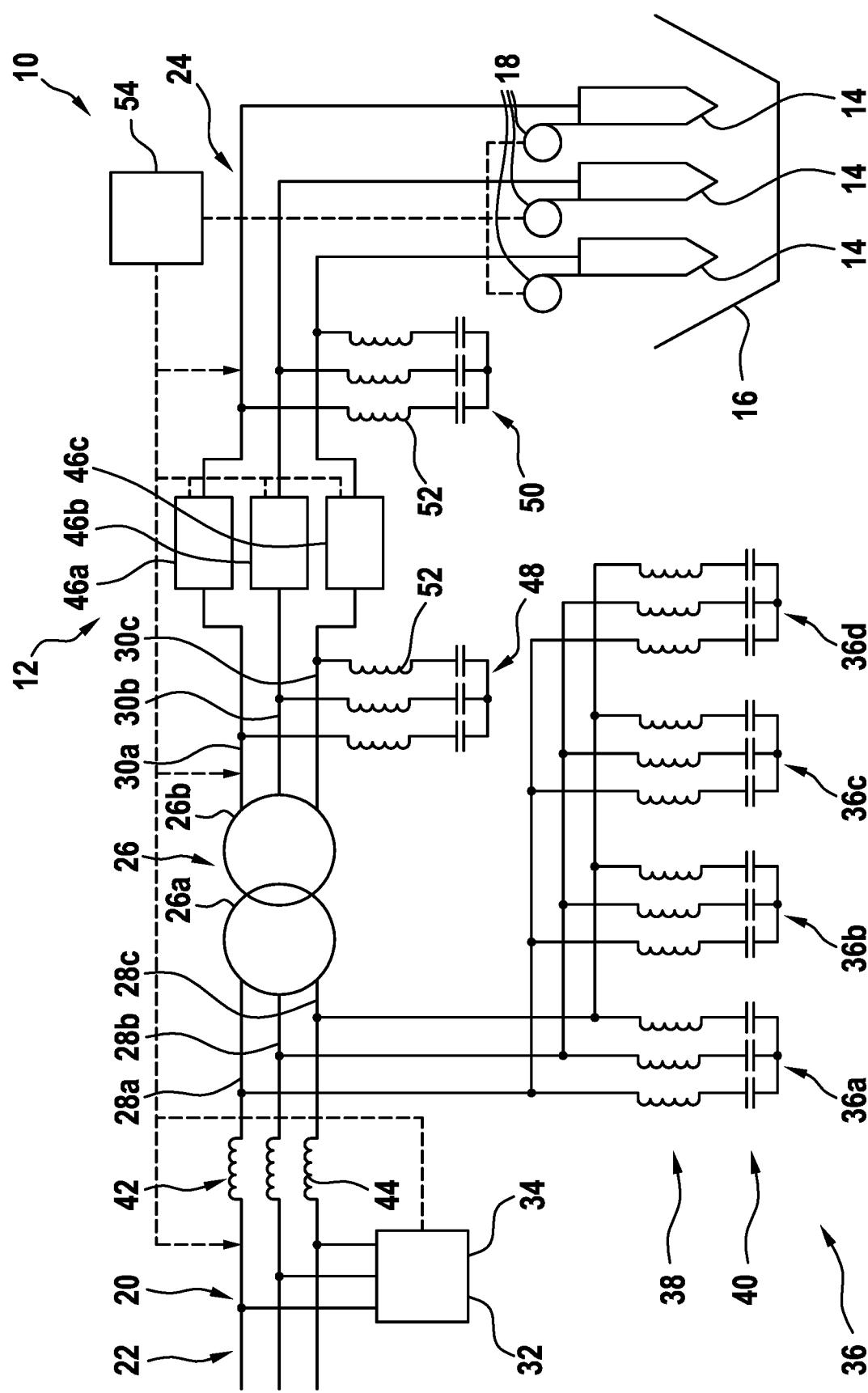
FIG. 2 is a schematic circuit diagram of an arc furnace according to a further embodiment of the present disclosure.

FIGS. 1 and 2 show an arc furnace 10 with a power supply system 12, which supplies electrodes 14 of the arc furnace 10 with electrical power. The electrodes 14 may be provided in a vessel 16, which is adapted for accommodating metal material. When the electrodes 14 are supplied with current, an electrical arc is generated and the metal material is melted. The electrodes may be moved in the vessel with the aid of mechanical actuators 18. In such a way, the length of the arc may be controlled.

The power supply system 12 is connected with an AC input 20 to an electrical grid 22 and supplies with an AC output 24 the electrodes 14. The AC input 20 and the AC output 24 are galvanically separated by a transformer 26, wherein a primary side 26a of the transformer is connected to the AC input 20 and a secondary side 26b of the transformer 26 is connected to the AC output 24. The transformer 26 transforms a medium AC voltage from the electrical grid 22 into a low AC voltage at the AC output 24. Both voltages may have a frequency of 50 Hz or 60 Hz.

As shown in FIGS. 1 and 2, the power supply system 12 may be a three-phase system. The AC input voltage may have three components and the power supply system 12 may have three phases 28a, 28b, 28c at the primary, medium voltage side 26a of the transformer 26. As shown, the power supply system 12 also may have three phases 30a, 30b, 30c at the secondary, low voltage side 26b of the transformer 26. However, it is also possible that a different number of phases are present as well on the primary side 26a as on the secondary side 26b. It is also possible that the numbers of phases are different on both sides 26a, 26b, for example, when the transformer 26 is designed with more than three windings at the secondary side 26b.

It may be that an active inductive reactor 32 and/or a compensating converter 34 is interconnected into and/or connected to the AC input 20, which is used for controlling flicker, which is generated by the arc furnace 10. The active inductive reactor 32 and/or a compensating converter 34 may be connected in parallel to the AC input 20. The components 32, 34 will be described in more detail below with respect to FIGS. 7 and 8.

Furthermore, a harmonic filter 36 may be interconnected into and/or connected to the AC input 20. The harmonic filter 36 may be connected in parallel to the AC input 20. The harmonic filter 36 may include several filter components 36a, 36b, 36c, 36d each of which is adapted to filter a specific higher order harmonic out of the AC voltage at the AC input 20. For example, the filter components 36a, 36b, 36c, 36d may be adapted for filtering out the 5th, 7th, 11th and 13th higher order harmonic. Each of the filter components 36a, 36b, 36c, 36d may be an LC filter and may include a capacitor 38 and an inductor 40, which may be connected in series. In the present case of a system with three phases 28a, 28b, 28c, each of the filter components 36a, 36b, 36c, 36d may include for each phase a capacitor 38 and an inductor 40, which are star-connected.

It also may be that a line filter 42, which is series-connected into the AC input 20, is present, which line filter 42 may include an inductor 44, which is series-connected into each phase 28a, 28b, 28c.

As shown in FIG. 1, the power supply system 12 furthermore may include a converter circuit 46a, 46b, 46c, which is series-connected into each phase 28a, 28b, 28c of the primary side. As shown in FIG. 2, alternatively or additionally, a converter circuit 46a, 46b, 46c may be series-connected into each phase 30a, 30b, 30c of the secondary side. The converter circuits 46a, 46b, 46c are used for current limitation, current boosting and/or power control and will be described in more detail with respect to FIGS. 3-5.

It may be possible that a passive filter/reactor 48 is connected between the circuits 46a, 46b, 46c and the transformer 26 and/or that a passive filter/reactor 50 is connected between the transformer 26 and the AC output 24. Such a passive filter/reactor 48 (or 50) may include three star-connected inductors 52, each of which is connected to a phase 28a, 28b, 28c (or 30a, 30b, 30c) of the primary side (or secondary side) of the power supply system 12.

FIGS. 1 and 2 also show a controller 54 for controlling the arc furnace and the power supply system 12. The controller 54 may receive measurement values from voltages and/or currents in the power supply system 12, such as an AC input voltage, an AC input current, an intermediate voltage and an intermediated current between the converter circuits 46a, 46b, 46c and the transformer, an AC output voltage and an AC output current. All these quantities may be multi-phase quantities.

Based on these measurement values and nominal quantities, such as a nominal electrode current, a nominal power supplied to the electrodes 14, a maximal flicker, etc., the controller may control the movement of the electrodes 14, i.e. the mechanical actuators 18, the active inductive reactor 32, the compensating converter 34 and the converter circuits 46a, 46b, 46c. This will also be described in more detail below.

Figure 3:
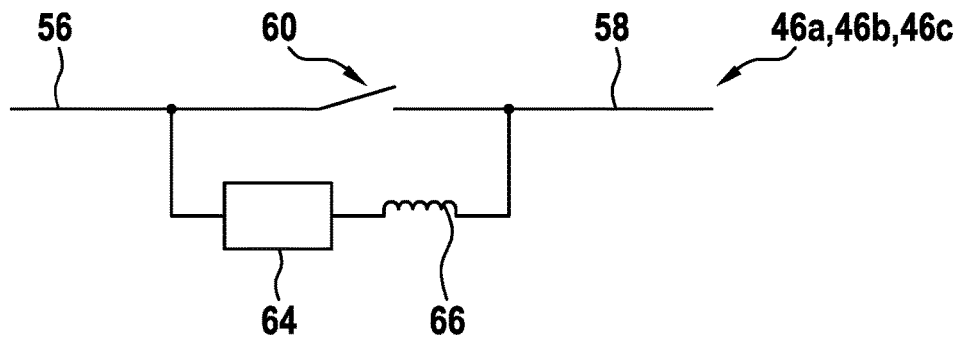
FIG. 3 is a schematic circuit diagram of a converter circuit for the arc furnace of FIGS. 1 and 2.

FIG. 3 shows one of the converter circuits 46a, 46b, 46c, which may be equally designed. The converter circuit 46a, 46b, 46c includes a circuit input 56 and a circuit output 58, with which it is interconnected in the respective phase 28a, 28b, 28c, 30a, 30b, 30c.

The converter circuit 46a, 46b, 46c may include a bypass switch 60, a converter cell 64 and an optional inductor 66 connected in series with the converter cell 64. The bypass switch 60 and the converter cell 64 are parallel-connected between the input 56 and the output 58. It has to be noted that the bypass switch 60 is optional and that the converter circuit solely may include the converter cell 64 together with the inductor 66. Converter cell switches may realize a bypass functionality and/or bypass state of the converter cell 64.

In general, the bypass switch 60 may be a controllable, bidirectional switch. The controller 54 may control the bypass switch 60 to be opened (conducting) or closed (isolating).

Figure 4:
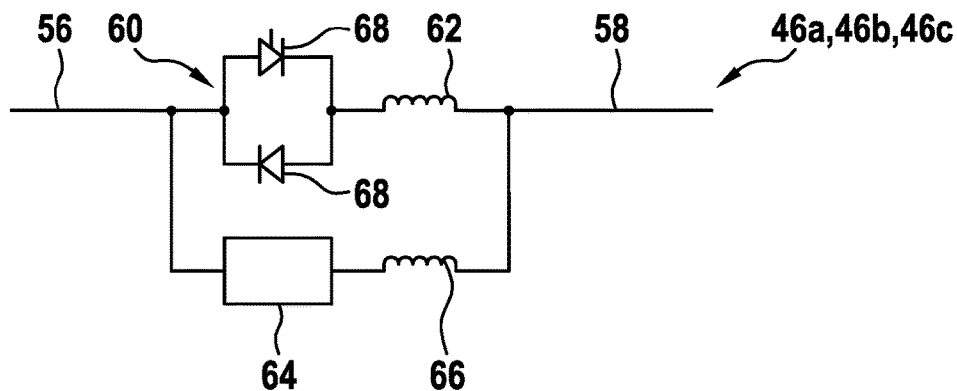
FIG. 4 is a schematic circuit diagram of a further converter circuit for the arc furnace of FIGS. 1 and 2.

FIG. 3 shows a mechanical bypass switch. In FIG. 4, the bypass switch is composed of semiconductor switches 68. The bypass switch 68 may be composed of two anti-parallel thyristors 68. Furthermore, it is shown that an inductor 62 may be series connected with the bypass switch 60. The inductor 62 may have an inductance at least 10 times smaller than the inductor 66.

Figure 5:
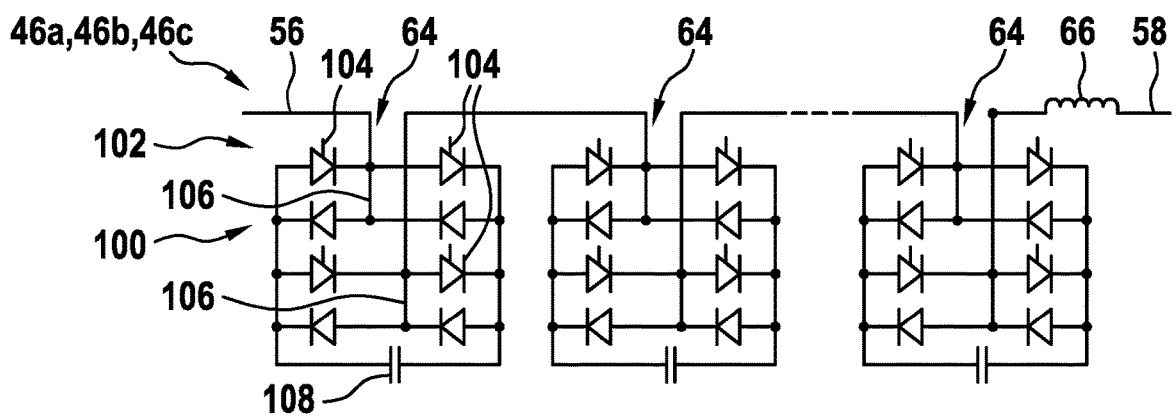
FIG. 5 is a schematic circuit diagram of series-connected converter cells for the arc furnace of FIGS. 1 and 2.

FIG. 5 shows series-connected converter cells 64, which may be series-connected between the input 56 and the output 58 of the converter circuit 46a, 46b, 46c. Also, the series-connection of converter cells 64 may be series-connected with an inductor 66. The converter cells 64 also may be of a three-level full bridge type and/or may include three-level full bridges. Furthermore, the series-connection may be connected in parallel with a bypass switch 60 and/or an inductor 62 as shown in FIGS. 3 and 4.

Each converter cell 64 may include a full-bridge 100, which is composed of two parallel half-bridges 102. Each half-bridge 102 includes two series-connected semiconductor switches 104, such as IGBTs and/or IGCTs, for example with antiparallel diode. A midpoint 106 is provided between the semiconductor switches 104 of each half-bridge 102. The midpoints 106 of a converter cell 64 are interconnected into a current path between the input 56 and the output 58. A converter cell capacitor 108 is connected in parallel to the half-bridges 102. Via the control of the controller 54, the semiconductor switches 104 may be switched to disconnect the capacitor 108 from the midpoints 106, and to connect the capacitor in two directions to these midpoints 106. Additionally, the semiconductor switches 104 may be switched to select two redundant zero states, which bypass the capacitor 108. These zero states may be seen as a bypass state of the converter cell 64.

It has to be noted that the converter cell 64 of FIGS. 3 and 4 may be designed like one of the converter cells 64 in FIG. 5.

Figure 6:
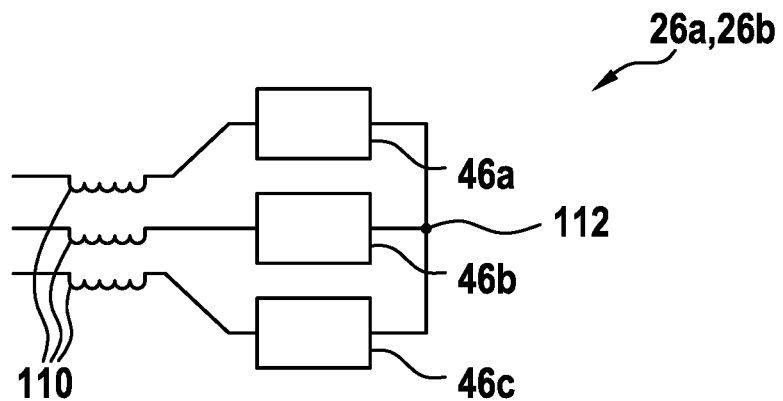
FIG. 6 is a schematic circuit diagram of a transformer with a converter circuit for the arc furnace of FIGS. 1 and 2.
Figure 7:
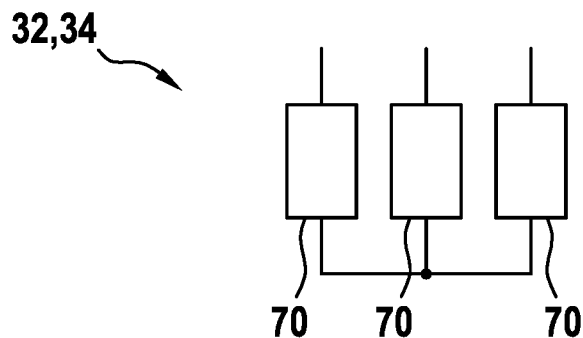
FIG. 7 is a schematic circuit diagram of a compensating converter for the arc furnace of FIGS. 1 and 2.

FIG. 6 shows further embodiments, how converter circuits 46a, 46b, 46c may be interconnected into the power supply 12. FIG. 6 shows the primary side 26a or alternatively the secondary side 26b of the transformer 26. The primary side 26a or the secondary side 26 of the transformer 26 includes three windings 110, which are star-connected via a star-point 112. In FIG. 6, each winding 110 is connected via a converter circuit 46a, 46b, 46c with the star-point 112. The converter circuits 46a, 46b, 46c of FIG. 6 may be designed like the ones of FIGS. 3-5. FIG. 7 shows the active inductive reactor 32 and/or the compensating converter 34 in more detail. In the case of an active inductive reactor 32, each branch 70 may be as shown in FIG. 5. The branches 70 may be star-connected at one end and connected to one of the phases 28a, 28b, 28c with the other end.

In the case of a compensating converter 34, each branch 70 may be a converter (such as an active controllable bridge converter) with an internal energy storage, for example in the form of a capacitor. The branches 70 may form a static var compensator, which may be controlled by the controller 54.

Figure 8:
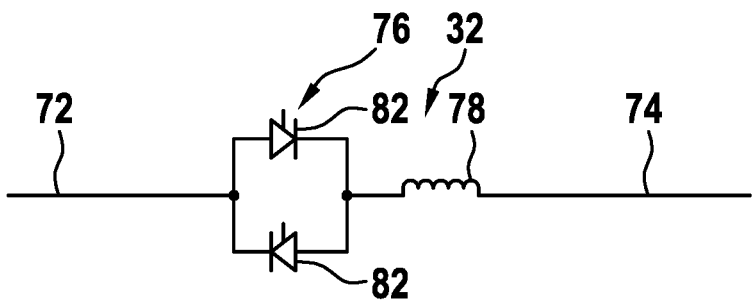
FIG. 8 is a schematic circuit diagram of an active inductive reactor for the arc furnace of FIGS. 1 and 2.

FIG. 8 shows a phase of an active inductive reactor 32. The active inductive reactor 32 includes an input 72 and an output 74. A bypass switch 76 and an inductor 78 are series-connected between the input 72 and the output 74. The bypass switch 76 is a controllable, bidirectional switch, which is composed of two anti-parallel thyristors 82.

Figure 9:
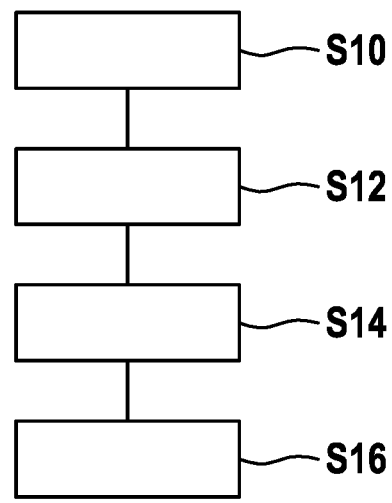
FIG. 9 is a flow diagram for a method for controlling the arc furnace of FIGS. 1 and 2.

FIG. 9 shows a flow diagram of a method that may performed automatically by the controller 54.

In step S10, during a start-up of the power supply system 12, the converter cells 64 of the converter circuits 46a, 46b, 46c are bypassed by closing a bypass switch 60. The power supply system 12 is connected with its AC input 20 to the electrical grid 22 and is energized. After energization of a transformer 26, which for example may be measured by measuring currents and/or voltages at the AC input side of the power supply system 12, the bypass switch 60 may be opened and/or the converter cells 64 may be controlled for adjusting the electrode current.

In step S12, the controller 54 measures one or more currents and/or one or more voltages in the power supply system 12. These voltages or currents may be an AC input voltage, an AC input current, an intermediate voltage and/or an intermediated current between the converter circuits 46a, 46b, 46c and the transformer 26, an AC output voltage and/or an AC output current.

From the measured quantities, an electrode current supplied to the electrodes 14 may be determined. For example, the electrode current may be directly measured as the AC output current or may be estimated from other measured quantities.

The converter cells 64 of the converter circuits 46a, 46b, 46c are controlled, such that the electrode current is adjusted to a nominal current. The nominal current may be provided by an outer control loop or may be determined by the controller 54 itself, for example, in dependence of an operation condition and/or a power that should be supplied to the electrodes 14.

In step S14, an overvoltage and/or a surge current in the converter circuit 46a, 46b, 46c is detected by the controller based on the measured quantities. In the case, such as fault is detected, the controller 54 protects the converter circuit 46a, 46b, 46c with the bypass switch 60 by opening and/or closing the bypass switch 60.

In step S16, the controller 54 also determines a flicker value from the measured quantities, for example from the AC input voltage. The active inductive reactor 32 and/or the compensating converter 34 then may be controlled by the controller 54 to minimize the flicker value.

It also may be that a further control objective of the converter circuits 46a, 46b, 46c is to minimize the flicker, and the converter circuit 46a, 46b, 46c and their converter cells 64 may be controlled accordingly. In this case, flicker control only may be performed with the converter circuits 46a, 46b, 46c.

While the disclosure has been illustrated and described in detail in the drawings and foregoing description, such illustration and description are to be considered illustrative or exemplary and not restrictive; the disclosure is not limited to the disclosed embodiments. Other variations to the disclosed embodiments can be understood and effected by those skilled in the art and practicing the claimed disclosure, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A power supply system for an electric arc furnace, the power supply system comprising:
    an AC input connectable to an electrical grid and an AC output for supplying at least one power electrode of the arc furnace, wherein the AC input has at least two phases and wherein the AC output has at least two phases;
    converter circuits interconnected between the AC input and the AC output, wherein a converter circuit is interconnected in each phase of the AC input or in each phase of the AC output; and
    a transformer connected between the AC input and the AC output;
    wherein each converter circuit comprises at least one converter cell with a capacitor and semiconductor switches for series connecting the capacitor between a circuit input and a circuit output of the converter circuit;
    wherein the power supply system is adapted for switching each converter circuit into a bypass state during a start-up of the power supply system by closing a bypass switch, wherein the bypass switch is connected in parallel with the at least one converter cell of the converter circuit and is adapted for connecting and disconnecting the circuit input and the circuit output, and wherein the power supply system is adapted for controlling the converter cell for adjusting the electrode current and opening the bypass switch after energization of the transformer.

2. The power supply system according to claim 1, wherein the semiconductor switches of the converter cell form two parallel connected half-bridges, wherein midpoints are connected between the circuit input and the circuit output; and
wherein the capacitor is connected in parallel to the half-bridges.

3. The power supply system according to claim 1, wherein each converter circuit comprises a plurality of converter cells connected in series between the circuit input and the circuit output.

4. The power supply system according to claim 1, wherein the bypass switch comprises semiconductor switches.

5. The power supply system according to claim 1, wherein an inductor is connected in series with the at least one converter cell.

6. The power supply system according to claim 1, wherein a further inductor is connected in series with a bypass switch between the circuit input and the circuit output.

7. The power supply system according to claim 1,
wherein the transformer is interconnected between the AC input and the converter circuit; or
wherein the transformer is interconnected between the converter circuit and the AC output; or
wherein the transformer comprises windings connected to a star-point at at least one of a primary side or a secondary side, wherein the converter circuit is connected in the star-point.

8. The power supply system according to claim 1, further comprising:
a harmonic filter interconnected in the AC input;
wherein the harmonic filter comprises at least two filter components, each filter component comprises a filter capacitor and a filter inductor and is adapted to another higher order harmonic of an AC input voltage.

9. The power supply system according to claim 1, further comprising:
an active inductive reactor interconnected into the AC input, wherein the active inductive reactor comprises a bypass switch and an inductor connected to the AC input;
wherein the active inductive reactor is controlled to minimize a flicker in the AC input.

10. A method for controlling a power supply system according to claim 1, the method comprising:
determining an electrode current supplied to the at least one electrode;
controlling the at least one converter cell, such that the electrode current is adjusted to a defined current;
during a start-up of the power supply system, bypassing the converter cell by closing the bypass switch; and
after energization of the transformer connected between the AC input and the AC output, controlling the converter cell for adjusting the electrode current and opening the bypass switch;
wherein the converter circuit is switched into a bypass state by at least one of switching the converter cell into a bypass state and closing the bypass switch.

11. The method according to claim 10, further comprising:
determining a flicker in the AC input of the power supply system; and
controlling the converter cell, such that the flicker is reduced.

12. The method of claim 10, further comprising:
detecting at least one of an overvoltage or a surge current in the converter circuit; and
protecting the converter circuit, when at least one of the overvoltage or the surge current is detected, by switching the converter circuit in a bypass state.

13. An electric arc furnace comprising:
a power supply system according to claim 1;
a controller adapted for performing the method according to claim 11;
a vessel for receiving metal material; and
power electrodes for melting the metal material, when supplied with current from the power supply system.

14. The power supply system according to claim 1, wherein a bypass functionality is realized by semiconductor switches of the converter cell.

15. The power supply system according to claim 1, wherein the bypass switch is a mechanical switch.

16. The power supply system according to claim 1, further comprising:
a compensating converter interconnected into the AC input;
wherein the compensating converter is controlled to minimize a flicker in the AC input.

* * * * *